Sept. 8, 1964          W. A. GRAFF          3,148,300
LAMP HAVING ENVELOPE OF GLASS OPAQUE TO
ULTRAVIOLET RADIATION
Filed Aug. 4, 1961
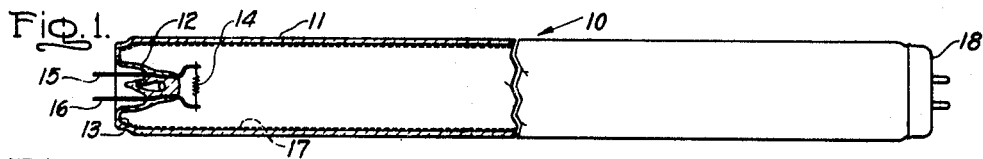
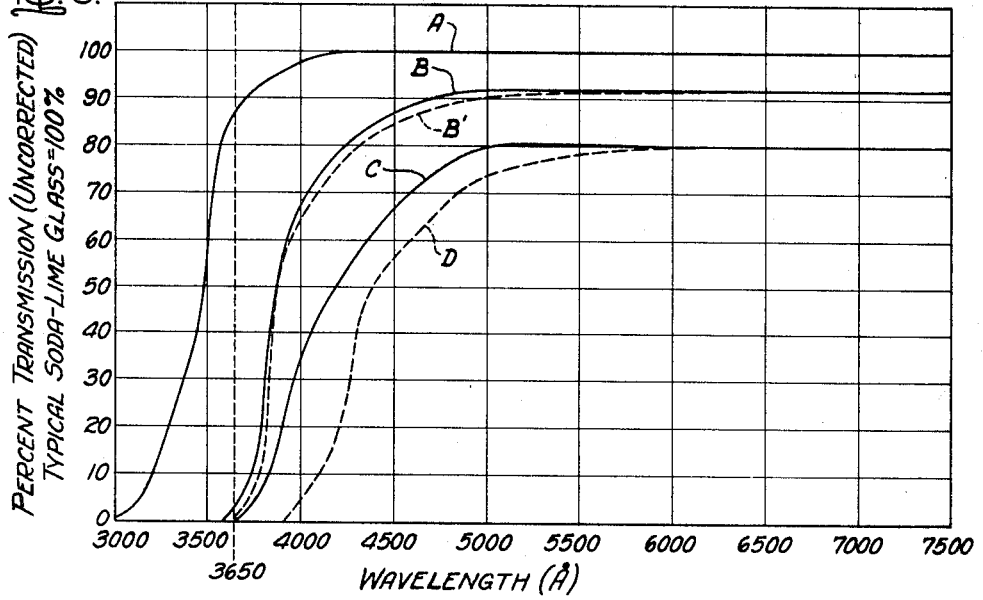
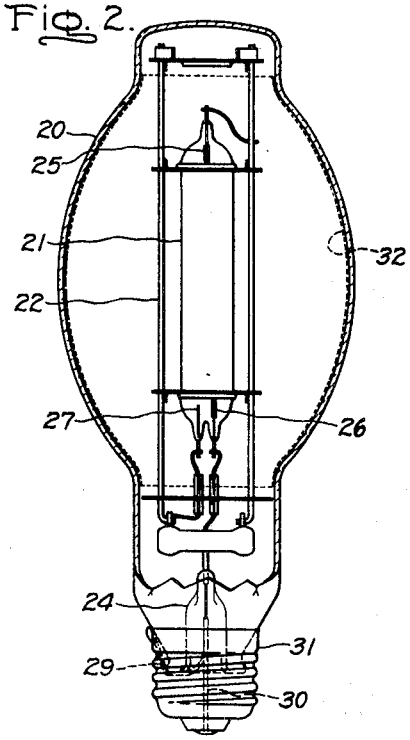
Inventor:
William A. Graff
by Otto Tichy
His Attorney

United States Patent Office 3,148,300
Patented Sept. 8, 1964

3,148,300
LAMP HAVING ENVELOPE OF GLASS OPAQUE
TO ULTRAVIOLET RADIATION
William A. Graff, Willoughby, Ohio, assignor to General
Electric Company, a corporation of New York
Filed Aug. 4, 1961, Ser. No. 129,267
9 Claims. (Cl. 313—221)

In electric discharge lamps having an ionizable gaseous atmosphere including mercury vapor, such as fluorescent discharge lamps and mercury vapor arc lamps, the ionized mercury vapor generates ultraviolet radiations as well as visible radiations. In such lamps used for illumination it is desirable that the lamp emit only visible radiations.

The soda-lime-silica glass commonly used in fabricating the tubular envelopes of fluorescent discharge lamps and which may be used for the glass bulb enclosing the quartz arc tube of high pressure mercury vapor arc lamps has a high transmission over the entire spectral range of visible wave lengths and, in the wall thicknesses used, does not transmit ultraviolet radiations of wave length shorter than about 3080 A. However, the glass transmits ultraviolet radiations of longer wave length emitted by the mercury vapor discharge in the lamp, that is, the radiations of approximately 3129 A., 3341 A. and 3650 A. wave length of the mercury spectrum. While the transmission of the glass for the radiations of 3129 A. and 3341 A. wave length is not substantial, the transmission thereof is approximately 88% for ultraviolet radiation of 3650 A. wave length. The emission of ultraviolet radiation of 3650 A. wave length by such lamps is undesirable because such radiation has a deleterious effect on various organic materials, such as organic thermoplastic or thermosetting materials.

Heretofore it has been proposed to reduce the ultraviolet transmission of such glass and glasses of other composition by incorporating in the glass ultraviolet absorbing materials. However, the incorporation of such materials in the glass has either failed to reduce substantially the transmission of the glass of ultraviolet radiation of 3650 A. wave length or, if the transmission of the glass for radiation of this wave length was effectively reduced, the transmission thereof for radiations in the visible spectral region, that is, radiations of approximately 4000 A. to 8000 A. wave length, was lowered to the extent that the glass was not desirable for use in lamps intended for producing visible light at high efficiency.

The oxides of cerium, titanium and vanadium, among other materials, such as ferric oxide, have been specified heretofore as materials to be incorporated in glasses for absorption of ultraviolet radiations. However, as far as applicant is aware the incorporation of such materials into glass in accordance with the teachings of the prior art has not resulted in glasses combining the desirable properties of high transmission for visible light, that is, a transmission of 90% and higher relative to the transmission of soda-lime glass over the entire visible spectral region, opaque to ultraviolet radiations of wave length shorter than 3650 A. and a transmission of not more than about 7% for ultraviolet radiations of 3650 A. wave length.

The principal object of the present invention is to provide glass having such properties for use in the arts generally and particularly for envelopes and bulbs of electric discharge lamps of the above type used for illumination.

Another object of the invention is to provide glass suitable for fabricating the electrode supporting stems of fluorescent discharge lamps, for example, and having a low transmission for radiation of 3650 A. wave length.

A further object of the invention is to provide a vitreous material applicable as a coating to the glass envelopes, bulbs and other glass parts of electric discharge lamps of the above type to substantially reduce the emission of radiation of 3650 A. wave length without substantial reduction in the emission of visible light by the lamp.

Further objects and advantages of the invention will appear from the accompanying drawing and the following description of species thereof.

Briefly stated, in accordance with one embodiment of the invention, selected quantities of three oxides, ceric oxide ($CeO_2$), titanium dioxide ($TiO_2$), and vanadium pentoxide ($V_2O_5$), are added to the batch of a vitreous composition such as, for example, soda-lime glass or lead glass and the batch is melted under oxidizing conditions. When the relative amounts of the oxide additives are correctly selected in accordance with the invention, the resultant vitreous composition is characterized by high absorption of ultraviolet radiation including radiation of 3650 A. wave length and high transmission of visible light.

In accordance with another embodiment of the invention, a vitreous composition such as lead glass containing correctly selected quantities of the three oxide additives is finely divided to form a frit, the frit is mixed with a liquid carrier, and the resulting slurry is first deposited and then fused as a coating on an article of vitreous material, such as a soda-lime glass lamp bulb, which normally transmits both ultraviolet radiation and visible light so as to substantially reduce the transmission of ultraviolet radiation while retaining a high transmission of visible light by the article.

In the drawing:

FIG. 1 is a partially cutaway, side elevational view of a tubular fluorescent discharge lamp of a well-known commercial type, the lamp base having been removed at the cutaway end of the lamp;

FIG. 2 is an elevational view, partly in section of a high pressure mercury vapor discharge lamp of a commercial type, and FIG. 3 is a graph showing the radiation transmission curve for a typical soda-lime glass now in use for the envelopes of such lamps as compared to transmission curves for the soda-lime and lead glasses embodying the present invention.

Referring first to FIG. 1, the double-ended fluorescent lamp 10 shown has a sealed tubular envelope comprised of a vitreous tube 11 having fused thereto at each of its ends the flared portion 13 of the vitreous stem tube 12. Each stem 12 supports a filamentary, electron emissive electrode 14 mounted on current inlead wires 15 and 16 sealed in and extending through the stem and projecting into the interior of the lamp 10. The inner surface of the tube 11 is coated with a fluorescent coating 17 which emits visible light when excited by ultraviolet radiation. A gaseous atmosphere including a starting gas, such as argon, at a few millimeters pressure, and mercury vapor is provided in the gas tight interior of the lamp 10. The mercury vapor is at a pressure of about 10 microns and the low pressure mercury arc discharge between the cooperating electrodes 14 produces a substantial amount of ultraviolet radiation of 2537 A. wave length during operation of the lamp for exciting the fluorescent coating 17. A bi-pin base 18 is secured to each end of the tubular envelope of the lamp.

The mercury vapor spectrum is produced by the arc discharge in the lamp which spectrum includes ultraviolet radiations at about 3650, 3340, 3130 and 3022 A. wave lengths. As pointed out above, the usual soda-lime glass constituting the vitreous tube 11 of the envelope does not transmit ultraviolet radiations of wave length shorter than about 3080 A. so that the lamp does not emit ultraviolet radiation having a wave length of 2537 A., for example. The radiations having wave lengths longer than 3080 A. are transmitted by the soda-lime glass to some extent and the transmission of the glass for radiations having a wave length of 3650 A. is in the order of about 88% in the thicknesses of the glass used for such fluorescent lamps, that is, approximately 1 to 2 millimeters thickness. Lead glass having similar light-transmitting properties as the soda-lime glass is usually used for the stems 12 of the lamp envelope. The ultraviolet radiation of wave length longer than 3080 A. transmitted by either the lime-glass tube 11 or the lead glass stems 12 is not desirable for the reasons stated above.

The high pressure mercury vapor arc discharge lamp shown in FIG. 2 of the drawing is of well-known commercial structure and comprises an outer glass bulb 20 and an inner arc tube 21 of quartz supported within the outer bulb by the harness or the mount structure 22 on the glass stem 24 of the bulb. A pair of cooperating electrodes 25 and 26 are sealed into opposite ends of the quartz tube 21 together with a starting electrode 27 mounted in proximity to the main arc discharge supporting electrode 26. Current inlead wires 29 and 30 connected to the contacts of the screw-threaded base 31 extend through the stem 24 of the bulb and are hermetically sealed thereto to which wires the electrodes 25, 26 and 27 are suitably connected for starting and operation of the arc discharge in the lamp. The bulb 20 has a coating 32 of visible light emissive fluorescent material on its inner surface.

The inner arc tube 21 contains a starting gas at a few millimeters of mercury pressure and mercury in such an amount that it is completely vaporized at a temperature slightly below that at which the arc tube is designed to operate. During operation the mercury vapor pressure is sufficient to constrict the discharge so that it appears as a luminous cord or thread of high brightness along the axis of the quartz arc tube. The outer bulb of the lamp is usually filled with an inert gas such as nitrogen.

The high pressure mercury vapor spectrum which includes radiations of wave length longer than 3080 A. is produced by the mercury vapor arc discharge in the lamp and such radiations are transmitted by the quartz arc tube and also by the outer glass bulb and the glass stem when these consist of soda-lime glass and lead glass, respectively. As in the case of the fluorescent discharge lamp described above, the outer glass bulb 20 and the glass stem 24 of the lamp of FIG. 2 do not transmit ultraviolet radiations of wave length shorter than about 3080 A.

Referring now to FIG. 3, curve A is a radiation transmission curve for a typical soda-lime glass suitable for use in making bulbs for mercury lamps and tubular envelopes for fluorescent lamps of the above type. It will be seen from curve A that a typical soda-lime glass is characterized by high transmission of visible light which is, of course, highly desirable in lamps. However, as also shown by curve A, soda-lime glass also transmits ultraviolet radiations in the range of about 3080 A. to 4000 A. wave length. A radiation transmission curve for a typical lead glass suitable for use in making lamp stems is substantially the same as the curve A for soda-lime glass shown in FIG. 3.

While soda-lime glass in general may have a relatively wide range of compositions with which the invention may be practiced, a typical composition may be the following in percentages by weight as calculated from the batch:

| Constituent: | Percent |
| --- | --- |
| $SiO_2$ | 72.5 |
| $Al_2O_3$ | 1.3 |
| CaO | 5.0 |
| MgO | 3.5 |
| $Na_2O$ | 17.2 |
| $K_2O$ | 0.2 |
| $Sb_2O_3$ | 0.3 |

A suitable batch for soda-lime glass having the above oxide composition is the following in parts by weight:

| | |
| --- | --- |
| Sand | 139.5 |
| Soda ash | 57 |
| Dolomite | 32.2 |
| Nepheline syenite | 7.8 |
| Soda nitre | 0.8 |
| Salt cake | 0.8 |
| Antimony trioxide | 0.6 |

The batch may be melted at a temperature at 1350° C. to 1450° C., inclusive.

By adding ceric oxide ($CeO_2$), titanium dioxide ($TiO_2$), and vanadium pentoxide ($V_2O_5$) according to the invention in carefully selected proportions to the batch of soda-lime glass having the above composition, a radiation transmission curve of the glass similar to curve B shown in FIG. 3 may be obtained. It will be apparent that glass having such a radiation transmission curve displays substantially ideal characteristics for most lamp applications since the transmission of ultraviolet radiations below 3650 A. wave length is almost entirely eliminated and the transmission at 3650 A. wave length is about 2% while the visible light transmission is high.

It has been found that the soda-lime glass batch with the three specified oxides added should be melted under oxidizing conditions.

It has also been found that the total percentage by weight of the oxide additives, $CeO_2$, $TiO_2$, and $V_2O_5$, in the soda-lime glass composition given above should preferably be in the range of 0.70% to 1.05%, inclusive, of the total weight of the entire glass composition in order to obtain the desirable light transmission characteristics represented by curve B. In addition to the desirability that the total percentage of the oxide additives be in the above specified range, it has been found that the individual additives making up the total amount of oxides added should be combined within a specific range of additive ratios in order to obtain the desired radiation transmission qualities. The individual oxides making up the total amount of oxides added should be combined in the following proportions: 5% to 50% $CeO_2$; 5% to 50% $TiO_2$, and 30% to 65% $V_2O_5$, inclusive. For soda-lime glasses having different compositions, these percentages may, of course, be changed slightly.

By way of example, reference is now directed to a particular soda-lime glass composition made in accordance with the invention which has been found to display particularly desirable radiation transmission characteristics. $CeO_2$, $TiO_2$, and $V_2O_5$ were added to the batch of the typical soda-lime glass having the above batch composition in the amount by weight of 0.70% of the entire finished glass composition and the batch was melted at a temperature of 1350° C. under oxidizing conditions. The percentages of the individual oxides in the glass making up the total amount of oxides added were: 20% $CeO_2$; 20% $TiO_2$; and 60% $V_2O_5$. The resultant soda-lime glass in a thickness of 2 mm. did not transmit ultraviolet radiations of wave length shorter than 3650 A. and transmitted only 2% of the ultraviolet light at a wave length of 3650 A. while transmitting 92% of the visible light having a wave length of 5000 A. The transmission of the glass is shown by curve B of FIG. 3.

The glass had the following oxide composition in percentages by weight as calculated from the batch:

| Constituent: | Percent |
|---|---|
| $SiO_2$ | 71.8 |
| $Al_2O_3$ | 1.3 |
| CaO | 5.0 |
| MgO | 3.5 |
| $Na_2O$ | 17.2 |
| $K_2O$ | 0.2 |
| $Sb_2O_3$ | 0.3 |
| $CeO_2$ | 0.14 |
| $TiO_2$ | 0.14 |
| $V_2O_5$ | 0.42 |

The batch composition was the following in parts by weight:

| | |
|---|---|
| Sand | 139.5 |
| Soda ash | 57.0 |
| Dolomite | 32.2 |
| Nepheline syenite | 7.8 |
| $NaNO_3$ | 0.8 |
| $Na_2SO_4$ | 0.8 |
| $Sb_2O_3$ | 0.6 |
| $CeO_2$ | 0.28 |
| $TiO_2$ | 0.28 |
| $V_2O_5$ | 0.84 |

As another example of the glass of the present invention, $CeO_2$, $TiO_2$ and $V_2O_5$ were added to the batch of the above typical soda-lime glass in the amount of 1.05% by weight of the total weight of the finished glass with the percentages of the individual oxides of the total of added oxides amounting to approximately 8% $CeO_2$, 46% $TiO_2$ and 46% $V_2O_5$. The transmission of the glass having this composition is represented by curve B' in FIG. 3. This glass is listed as glass B in the following table along with other glass compositions in the above ranges given in percent by weight as calculated from the batch as further examples of the invention.

*Table I*

| | A | B | C | D | E |
|---|---|---|---|---|---|
| $SiO_2$ percent | 71.65 | 71.65 | 71.65 | 71.8 | 71.8 |
| $Al_2O_3$ do | 1.3 | 1.3 | 1.3 | 1.3 | 1.3 |
| CaO do | 4.9 | 4.9 | 4.9 | 5.0 | 5.0 |
| MgO do | 3.4 | 3.4 | 3.4 | 3.5 | 3.5 |
| $Na_2O$ do | 17.2 | 17.2 | 17.2 | 17.2 | 17.2 |
| $K_2O$ do | 0.2 | 0.2 | 0.2 | 0.2 | 0.2 |
| $Sb_2O_3$ do | 0.3 | 0.3 | 0.3 | 0.3 | 0.3 |
| $CeO_2$ do | 0.485 | 0.08 | 0.35 | 0.3 | 0.1 |
| $TiO_2$ do | 0.08 | 0.485 | 0.35 | 0.1 | 0.3 |
| $V_2O_5$ do | 0.485 | 0.485 | 0.35 | 0.3 | 0.3 |
| Percent transmission 3,650 A. wave length | 0.5 | 1.0 | 3.0 | 3.0 | 7.0 |
| Percent transmission 5,000 A. wave length | 9.0 | 90.0 | 92.0 | 90.0 | 93.0 |

As pointed out previously in this specification, the oxide additives, $CeO_2$, $TiO_2$ and $V_2O_5$, may also be added in proper proportions to a lead glass composition to substantially reduce the transmission of ultraviolet radiation by the lead glass. This reduction in ultraviolet transmission by lead glass is particularly desirable for lamp stem construction when bases including an organic plastic material which may be adversely affected by ultraviolet radiation passing through the stem are mounted on the ends of the fluorescent lamp, for example. As shown by curve C in FIG. 3, the addition of the specific oxides to a typical lead glass has a much greater reduction on the transmission of visible light than similar additions of the oxides have on the transmission of such radiation by the usual soda-lime glass shown by curve B. As in the case of soda-lime glass, the lead glass batch including the addition of $CeO_2$, $TiO_2$, and $V_2O_5$ should be melted under oxidizing conditions in order to give the resultant glass optimum radiation transmission characteristics. A particular lead glass composition which has been found to transmit in a thickness of about 1 mm. only one half of one percent of ultraviolet radiation having a wave length of 3650 A. while transmitting about 80% of the radiations at 5000 A. wave length, as shown by curve C of FIG. 3, may be made from a batch composed of the following constituent ingredients in the indicated proportions in parts by weight:

| | |
|---|---|
| Sand | 120.7 |
| Soda ash | 51.6 |
| Litharge | 40.0 |
| $Al(OH)_3$ | 8.2 |
| $NaNO_3$ | 0.8 |
| $Na_2SO_4$ | 0.8 |
| $Sb_2O_3$ | 0.8 |
| $CeO_2$ | 0.42 |
| $TiO_2$ | 0.42 |
| $V_2O_5$ | 1.26 |

The oxide composition of the glass in percentages by weight as calculated from the batch is:

| Constituent: | Percent |
|---|---|
| $SiO_2$ | 60.25 |
| $Al_2O_3$ | 3.00 |
| PbO | 20.00 |
| $Na_2O$ | 15.30 |
| $Sb_2O_3$ | 0.40 |
| $CeO_2$ | 0.21 |
| $TiO_2$ | 0.21 |
| $V_2O_5$ | 0.63 |

The batch was melted under oxidizing conditions at a temperature of about 1400° C.

It may be desired to use a frit as a coating on the usual soda-lime glass to reduce the ultraviolet radiation transmission through the glass without substantially reducing the transmission of visible light by a lamp envelope or bulb of such glass. In forming the frit in accordance with this invention, a lead glass composition is first made to which selected quantities of $CeO_2$, $TiO_2$, and $V_2O_5$ have been added. The solidified lead glass is then finely divided in the usual manner to form a frit and the frit is suspended in a liquid carrier such as, for example, alcohol. The resultant slurry may then be deposited as a coating and, after evaporation of the carrier, fired onto the usual soda-lime glass of the above typical composition, the coated glass displaying the desired radiation transmission characteristics. A particular lead glass which has been found to display desirable characteristics when used as a frit has the following batch composition in parts by weight:

| | |
|---|---|
| Sand | 10 |
| Soda ash | 16.7 |
| Litharge | 72.0 |
| $Al(OH)_3$ | 15.4 |
| ZnO | 51.0 |
| Boric acid | 84.0 |
| $NaNO_3$ | 0.8 |
| $Sb_2O_3$ | 0.6 |
| $CeO_2$ | 0.56 |
| $TiO_2$ | 0.56 |
| $V_2O_5$ | 1.68 |

The oxide composition of the glass in percentages by weight as calculated from the batch is:

| Constituent: | Percent |
|---|---|
| $SiO_2$ | 4.87 |
| $Na_2O$ | 4.90 |
| PbO | 35.355 |
| $Al_2O_3$ | 4.95 |
| ZnO | 25.05 |
| $B_2O_3$ | 23.22 |
| $Sb_2O_3$ | 0.28 |
| $CeO_2$ | 0.275 |
| $TiO_2$ | 0.275 |
| $V_2O_5$ | 0.825 |

The batch was melted under oxidizing conditions at a temperature of about 1300° C. With a lead glass having the above composition, it has been found that in a thickness of 1 mm. the solid glass before the frit is made therefrom transmits no ultraviolet radiation having a wave length of 3650 A. and shorter and transmits approximately 75% of the visible radiations at 5000 A. wave length as shown by curve D of FIG. 3. When the glass was applied as a frit and then fused to form a coating about 0.06 mm. thick on the inner surface of a tube of about 1 mm. wall thickness and consisting of typical soda-lime glass used for fluorescent lamps the tube thus coated transmitted only about 4% of ultraviolet radiation of 3650 A. wave length and had a high transmission in the visible.

The transmission measurements of the soda-lime glass compositions with the oxide additions of this invention were made on a Beckman DK-2 recording spectrophotometer with the glass in a thickness of 2 mm. The measurements were compared to an air path and were uncorrected for reflection losses. The transmission measurements of the lead glasses in a thickness of 1 mm. were made in the same way.

The addition of the oxides $CeO_2$, $TiO_2$ and $V_2O_5$ to the typical soda-lime glass used for fluorescent lamp tubing or the typical lead glass used for the stems of such lamps, in accordance with the present invention, does not change the physical properties of such glasses, such as the coefficient of expansion and the softening point, to any appreciable extent.

It will thus be seen that the invention provides for the addition of selected quantities of certain oxides to the batch of a vitreous composition such as, for example, soda-lime glass or lead glass melted under oxidizing conditions, whereby the transmission of ultraviolet radiation through the vitreous composition is substantially reduced while a high transmission of visible light is retained. The vitreous composition may be used as a light transmitting solid or, as in the example described above, may be used for making a frit which may be deposited and then fused as a coating to make another vitreous body substantially opaque to ultraviolet radiations.

The specific embodiments of the invention described herein are presented merely as examples of the many forms the practice of the invention may take. Therefore, it is intended in the appended claims to cover all modifications and variations which come within the spirit and scope of the invention.

What I claim as new and desire to secure by Letters Patent of the United States is:

1. An electric discharge lamp having a light source emissive of visible and ultraviolet radiations including radiations of approximately 3650 A. wave length and a glass wall associated with said source in radiation receiving and protective relation thereto, said wall at least in part being of glass from the group consisting of soda-lime glass and lead glass highly transmissive of visible light and containing by weight of the glass constituting said wall part approximately 0.70 to 1.38 percent, inclusive, mixed cerium, titanium and vanadium oxides to reduce substantially the transmission of ultraviolet radiations of about 3650 A. wave length.

2. An electric discharge lamp having a light source emissive of visible and ultraviolet radiations including radiations of approximately 3650 A. wave length and a glass wall associated with said source in radiation receiving and protective relation thereto, said wall at least in part being of glass from the group consisting of sola-lime glass and lead glass highly transmissive of visible light and containing by weight of the glass constituting said wall part approximately 0.70 to 1.05 percent, inclusive, mixed cerium, titanium and vanadium oxides to reduce substantially the transmission of ultraviolet radiations of about 3650 A. wave length.

3. An electric discharge lamp having a light source emissive of visible and ultraviolet radiations including radiations of approximately 3650 A. wave length and a glass wall associated with said source in radiation receiving and protective relation thereto, said wall at least in part being of glass from the group consisting of soda-lime glass and lead glass highly transmissive of visible light and containing by weight of the glass constituting said wall part approximately 0.70 to 1.05 percent, inclusive, mixed cerium, titanium and vanadium oxides to reduce substantially the transmission of ultraviolet radiations of about 3650 A. wave length, the total amount of said oxides being composed of about 5 to 50 percent $CeO_2$, about 5 to 50 percent $TiO_2$ and about 30 to 65 percent $V_2O_5$, inclusive.

4. A glass having a high transmission for visible radiations and a transmission of not more than about 7 percent of ultraviolet radiations of approximately 3650 A. wave length, said glass being from the group consisting of soda-lime glass and lead glass and containing by weight of the glass as ultraviolet absorption materials approximately 0.70 to approximately 1.05 percent, inclusive, mixed cerium, titanium and vanadium oxides, the total amount of said oxides being composed of about 5 to 50 percent $CeO_2$, about 5 to 50 percent $TiO_2$ and about 30 to 65 percent $V_2O_5$, inclusive.

5. A glass having a transmission of about 90 percent for radiations of 5,000 A. wave length and not more than about 7 percent for radiations of approximately 3650 A. wave length relative to the transmission of soda-lime glass for electric lamp envelopes, said glass being a soda-lime glass containing by weight as ultraviolet absorption material approximately 0.70 to 1.05 percent, inclusive, of mixed cerium, titanium and vanadium oxides, the total amount of said oxides being composed of about 5 to 50 percent $CeO_2$, about 5 to 50 percent $TiO_2$, and about 30 to 65 percent $V_2O_5$, inclusive.

6. A glass having a transmission of about 92 percent for radiations of 5,000 A. wave length and not more than about 2 percent for radiations of approximately 3650 A. wave length relative to the transmission of soda-lime glass for electric lamp envelopes, said glass having the following oxide composition in percentages by weight as calculated from the batch:

| | Percent |
|---|---|
| $SiO_2$ | 71.8 |
| $Al_2O_3$ | 1.3 |
| CaO | 5.0 |
| MgO | 3.5 |
| $Na_2O$ | 17.2 |
| $K_2O$ | 0.2 |
| $Sb_2O_3$ | 0.3 |
| $CeO_2$ | 0.14 |
| $TiO_2$ | 0.14 |
| $V_2O_5$ | 0.42 |

7. A glass having a transmission of about 90 percent for radiations of 5,000 A. wave length and not more than about one percent for radiations of approximately 3650 A. wave length relative to the transmission of soda-lime glass for electric lamp envelopes, said glass being a soda-lime glass having the following oxide composition as calculated from the batch:

| | Percent |
|---|---|
| $SiO_2$ | 71.65 |
| $Al_2O_3$ | 1.3 |
| CaO | 4.9 |
| MgO | 3.4 |
| $Na_2O$ | 17.2 |
| $K_2O$ | 0.2 |
| $Sb_2O_3$ | 0.3 |
| $CeO_2$ | 0.08 |
| $TiO_2$ | 0.485 |
| $V_2O_5$ | 0.485 |

8. A glass having a transmission of about 80 percent for radiations of 5,000 A. wave length and not more than about one percent of ultraviolet radiations of approximately 3650 A. wave length relative to the transmission of soda-lime glass for electric lamp envelopes, said glass being a lead glass having the following oxide composition in percentages by weight as calculated from the batch:

| | Percent |
|---|---|
| $SiO_2$ | 60.25 |
| $Al_2O_3$ | 3.00 |
| $PbO$ | 20.00 |
| $Na_2O$ | 15.30 |
| $Sb_2O_3$ | 0.40 |
| $CeO_2$ | 0.21 |
| $TiO_2$ | 0.21 |
| $V_2O_5$ | 0.63 |

9. A glass having a transmission of about 75 percent for radiations of 5,000 A. wave length and opaque to radiations of approximately 3650 A. wave length relative to the transmission of soda-lime glass for electric lamp envelopes, said glass being a lead glass having the following oxide composition in percentages by weight as calculated from the batch:

| | Percent |
|---|---|
| $SiO_2$ | 4.87 |
| $Na_2O$ | 4.90 |
| $PbO$ | 35.355 |
| $Al_2O_3$ | 4.95 |
| $ZnO$ | 25.05 |
| $B_2O_3$ | 23.22 |
| $Sb_2O_3$ | 0.28 |
| $CeO_2$ | 0.275 |
| $TiO_2$ | 0.275 |
| $V_2O_5$ | 0.825 |

References Cited in the file of this patent

UNITED STATES PATENTS

| 2,774,903 | Burns | Dec. 18, 1956 |
| 2,862,131 | Escher-Desriveres | Nov. 25, 1958 |
| 2,924,636 | Broderick | Feb. 9, 1960 |